July 11, 1961
H. D. SNELL
2,991,670
MULTIPLE REAMING TOOL
Filed Feb. 24, 1959
3 Sheets-Sheet 1
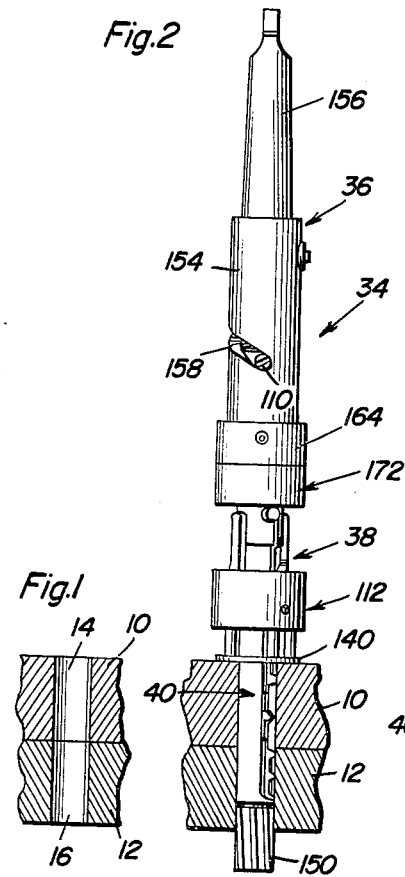
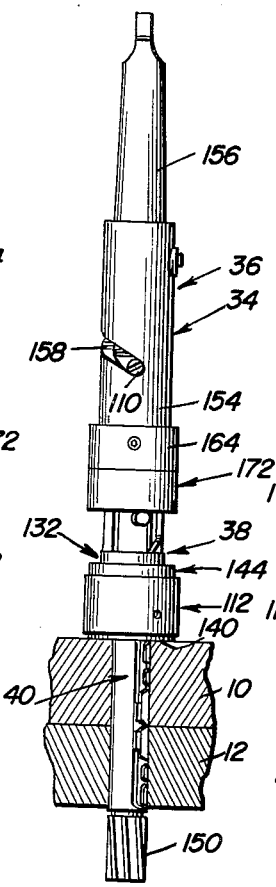
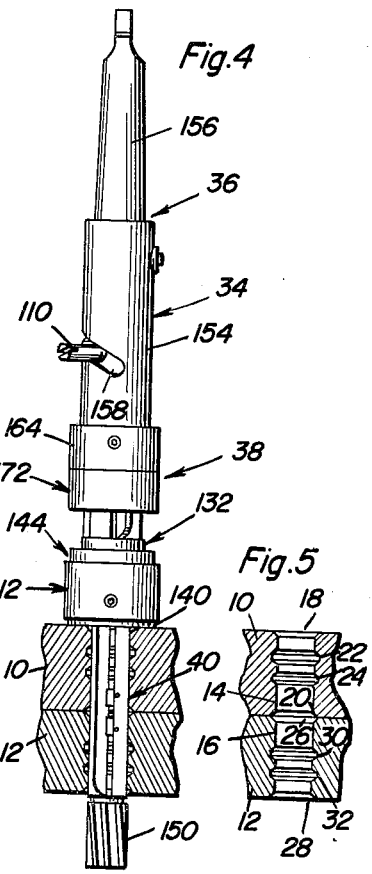
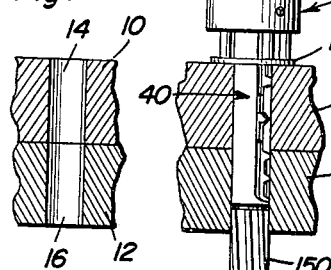
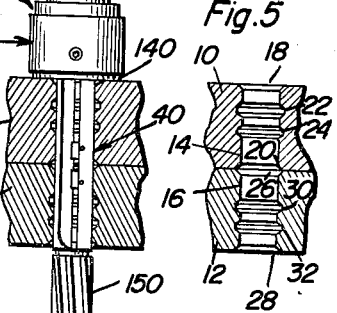
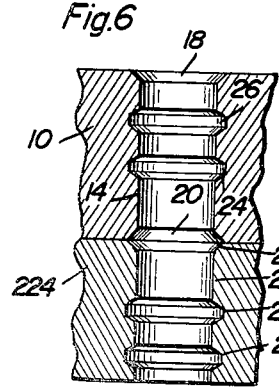
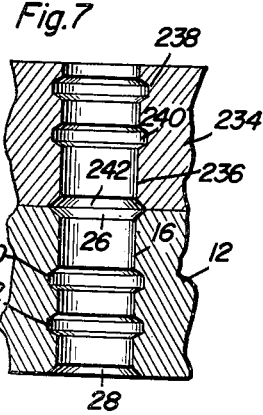
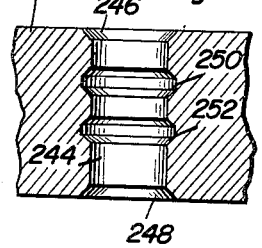
Harm D. Snell
INVENTOR.

July 11, 1961
H. D. SNELL
2,991,670
MULTIPLE REAMING TOOL
Filed Feb. 24, 1959
3 Sheets-Sheet 2
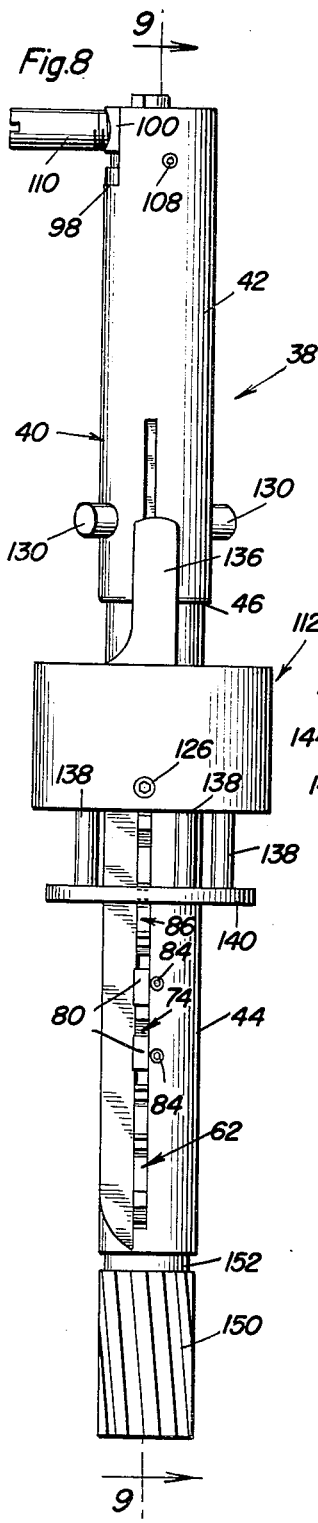
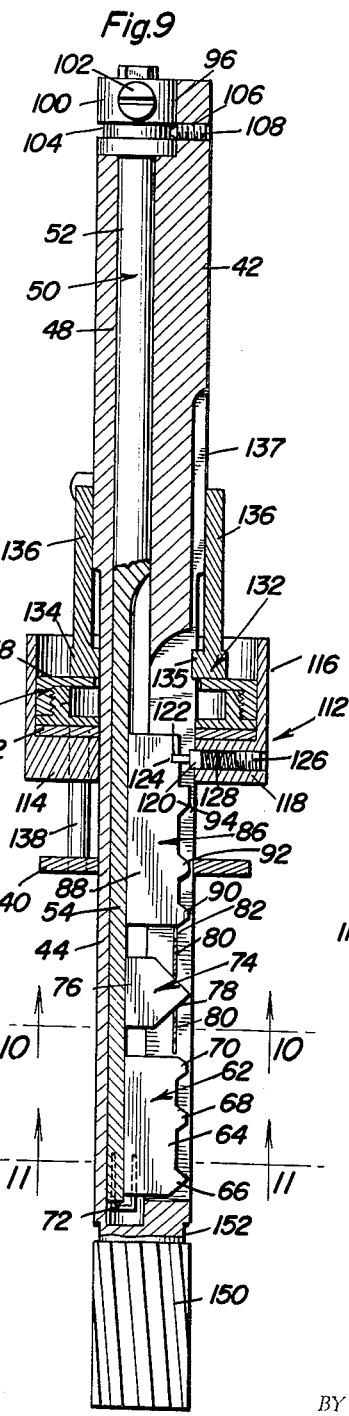
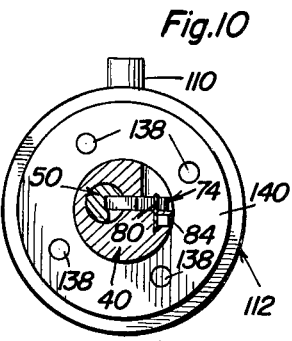
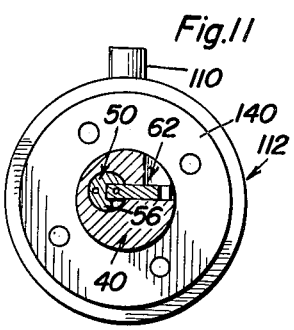
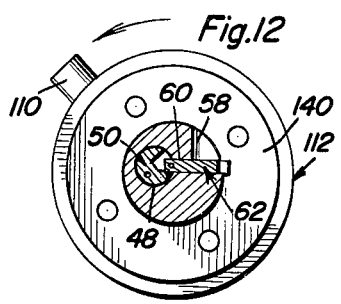
Harm D. Snell
INVENTOR.
BY *Clarence A. O'Brien*
*and Harvey B. Jacobson*
Attorneys July 11, 1961
H. D. SNELL
2,991,670
MULTIPLE REAMING TOOL
Filed Feb. 24, 1959
3 Sheets-Sheet 3
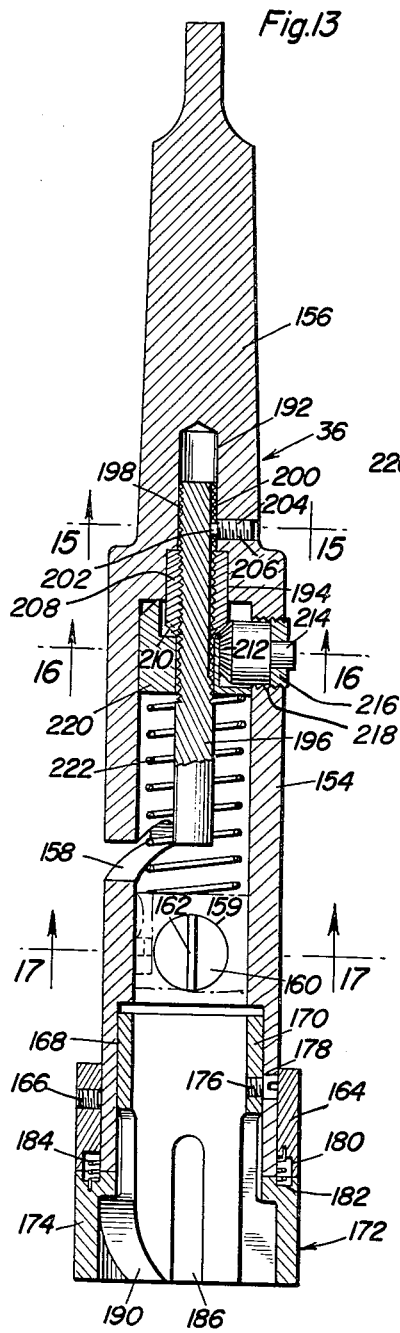
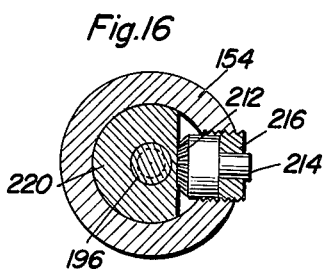
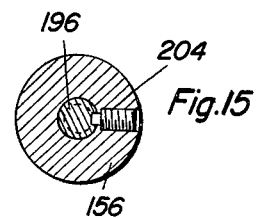
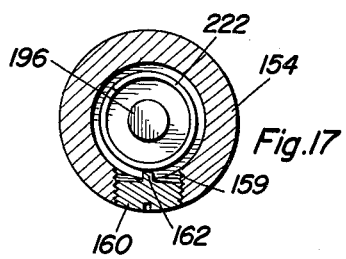
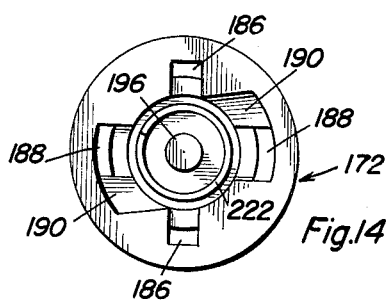
Harm D. Snell
INVENTOR.
BY *Clarence A. O'Brien*
*and Harvey B. Jacobson*
Attorneys

United States Patent Office 2,991,670
Patented July 11, 1961

2,991,670
MULTIPLE REAMING TOOL
Harm D. Snell, Port Arthur, Tex., assignor to
Noble W. Wise, Orange, Tex.
Filed Feb. 24, 1959, Ser. No. 794,979
11 Claims. (Cl. 77—73.5)

This invention relates in general to new and useful improvements in machine tools, and more specifically to a multiple reaming tool.

This invention relates primarily to a tool which may be used to accurately ream bores in plates and immediately thereafter as a part of a continuous operation form grooves in the plate as is desired. This is accomplished by providing a tool which is provided at the extreme lower end thereof with the necessary reamer and which is equipped above the reamer with expandible reamers which may be projected into the interior of the plate at the desired spaced interval along the bore through the plate so as to form the desired groove or grooves therein.

Another object of this invention is to provide an improved multiple reaming tool, the multiple reaming tool being of such a nature whereby when used will ream to the desired diameter a bore in the plate and then form in the desired position in the same plate concentric of the bore grooves, the tool being so constructed whereby the operation thereof is automatic.

Another object of this invention is to provide an automatic multiple reaming tool which is so constructed whereby as it passes downwardly through a bore in a plate or like member, the bore is first reamed and after the tool is properly aligned with the plate, further downward movement of the tool will result in the projection of individual reamers which will cut grooves in the plate concentric to the bore.

A further object of this invention is to provide an automatic multiple reaming tool which includes a housing having a shank adapted to be received in a power tool of the drill press type, there being mounted in the housing for longitudinal sliding movement a spindle which carries a cam rod, there being associated with the cam rod a plurality of individual reamers, which reamers are projected automatically from the spindle in response to the stopping of the longitudinal movement of the spindle and the continued movement of the housing relative to the spindle so that the two may be used to form internal annular grooves in plates and the like.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary sectional view taken through a pair of superimposed plates, the plates having aligned bores therein;

FIGURE 2 is a view similar to FIGURE 1 and shows in the process of being passed through the bores of the plate a reamer which is a part of the multiple reaming tool;

FIGURE 3 is a view similar to FIGURE 2 and shows the multiple reaming tool after the reamer on the end thereof has completely passed through the bores in the plates and has reamed the bores to the desired diameter;

FIGURE 4 is a view similar to FIGURE 2 and shows the multiple reaming tool after it has been further actuated so as to project additional reamers thereof for the purpose of forming annular grooves of the interior of the plate in concentric relation to the bores;

FIGURE 5 is a fragmentary vertical sectional view similar to FIGURE 1 and shows the finished condition of the bores through the plate;

FIGURE 6 is an enlarged fragmentary vertical sectional view taken through a pair of different plates than those of FIGURE 1 and shows the manner in which the same two will function when the lowermost plate is thinner than the upper plate;

FIGURE 7 is an enlarged fragmentary sectional view similar to FIGURE 6, but shows a different pair of plates wherein the upper plate is thinner than the bottom plate and the multiple reaming tool has been adjusted to compensate for the thinness of the upper plate;

FIGURE 8 is an enlarged elevational view of the spindle portion of the multiple reaming tool as it appears removed from the housing portion thereof;

FIGURE 9 is an enlarged vertical sectional view taken substantially upon the plane indicated by the section line 9—9 of FIGURE 8 and shows further the specific details of the spindle portion of the tool;

FIGURE 10 is an enlarged transverse horizontal sectional view taken substantially upon the plane indicated by the section line 10—10 of FIGURE 9 and shows the manner in which an intermediate one of the expandible reamers is mounted relative to the spindle;

FIGURE 11 is an enlarged transverse sectional view taken substantially upon the plane indicated by the section line 11—11 of FIGURE 9 and shows the manner in which another one of the reamers is secured to the spindle;

FIGURE 12 is an enlarged fragmentary sectional view similar to FIGURE 11 and shows the reamer of FIGURE 11 in its projected position which is accomplished by rotating the cam rod with respect to the spindle;

FIGURE 13 is an enlarged vertical sectional view taken through the housing portion of the multiple reaming tool and shows the specific details of the components thereof;

FIGURE 14 is a bottom view of the housing portion of FIGURE 13 and shows the specific details of a cam and interlock member carried thereby;

FIGURE 15 is an enlarged transverse sectional view taken substantially upon the plane indicated by the section line 15—15 of FIGURE 13 and shows the manner in which a stop member is mounted in the housing portion for longitudinal movement only;

FIGURE 16 is an enlarged transverse sectional view taken substantially upon the plane indicated by the section line 16—16 of FIGURE 13 and shows the details of the gear drive for the stop member;

FIGURE 17 is an enlarged transverse sectional view taken substantially upon the plane indicated by the section line 17—17 of FIGURE 13 and shows the manner in which the spindle is initially drivingly connected to the housing portion for rotation therewith and for a limited longitudinal sliding movement; and FIGURE 18 is an enlarged fragmentary vertical sectional view taken through a single plate reamed with the reaming tool.

Referring now to the drawings in detail, it will be seen that there is illustrated in FIGURE 1 a pair of superimposed plates 10 and 12 which have aligned bores 14 and 16, respectively. An example of the use of the plates 10 and 12 is in the formation of heat exchangers wherein the plates 10 and 12 will function as end plates and the bores 14 and 16 will have soldered therein ends of tubes. It is necessary that the bores 14 and 16 be reamed accurately to snugly receive the tubes. Furthermore, it is desired that opposite ends of the bores 14 and 16 be reamed internally to form annular grooves 18 and 20 at the opposite ends of the bore 14 and other annular grooves 22 and 24 in the central portion of the bore 14. Annular grooves 26 and 28 are formed at opposite ends of the bore 14 and other annular grooves 30 and 32 are formed intermediate the ends of the bores 16.

In order that the plates 10 and 12 may be machined so as to appear as illustrated in FIGURE 5, there has been provided the multiple reaming tool which is the subject of this invention, the tool being referred to in general by the reference numeral 34. The tool 34 is formed of two major compartments, an upper housing portion 36 and a lower spindle portion 38.

Referring now to FIGURES 8 through 12, inclusive, it will be seen that the spindle portion 38 includes an elongated spindle 40. The spindle 40 has an upper portion 42 and a lower portion 44, the lower portion 44 being of a smaller diameter than the upper portion 42 and the two portions 42 and 44 intersecting to form a shoulder 46.

Extending longitudinally through the spindle 40 is a bore 48 in which there is mounted for limited rotation a cam rod 50. The upper part of the cam rod 50 is referred to by the reference numeral 52 and is circular in cross-section. On the other hand, the lower portion of the cam rod 50 which is referred to by the reference numeral 54, has a quadrant thereof removed and projecting into the quadrant integral cam portion 56, as is clearly illustrated in FIGURES 10, 11 and 12.

Also as is best illustrated in FIGURES 10, 11 and 12, the lower portion 44 of the spindle 40 is provided with a longitudinal relief 58 whose cross-section is best illustrated in these three figures. Further, the relief 58 has an extension in the form of a flap 60 which opens into the bore 48.

Seated in the flap 60 and projecting into the relief 58 is a lower reamer member 62 which includes a body 64 which has projecting outwardly therefrom a lower cutter portion 66, the intermediate cutter portion 68 and an upper cutter portion 70.

The reamer 62 is connected to the lower end of the cam rod 50 by means of a generally U-shaped clip 72. The clip 72 has opposite ends thereof engaged in the end of the cam rod 50 and in the lower end of the reamer 62. The clip 72 is formed of resilient material so that the legs thereof may separate as is necessary in the operation of the tool 34.

Also seated in the slot 60 and engaged in the cam rod 50 is an intermediate reamer 74. The intermediate reamer 74 includes a body portion 76 which terminates in an enlarged tapered cutter 78. The intermediate reamer 74 is held in place by a pair of deflectable leaf springs 80 which are disposed on opposite sides of the cutter 78 and which have portions thereof seated in a longitudinal groove 82 formed in the spindle lower portion 44, as is best shown in FIGURE 9. The latch springs 80 are retained in place by means of setscrews 84 illustrated in FIGURE 8.

Disposed in the upper part of the slot 60 is an upper reamer which is referred to in general by reference numeral 86. The upper reamer 86 includes a body portion 88 which engages the cam rod 50. Projecting from the body portion 88 is a lower cutter 90, an intermediate cutter 92 and an upper cutter 94. The reamer 86 is held in engagement with the cam rod 50 by means which will be described in more detail hereinafter.

The extreme upper end of the spindle 40 is provided with an enlarged bore 96 which is disposed concentric to the bore 48 and forms a continuation thereof. The bore 96 also opens into a relief 98 through one side of the spindle 40, as is best shown in FIGURE 8.

Seated in the bore 96 is a fitting 100 which is secured to the cam rod 50 for rotation therewith by means of a setscrew 102. The fitting 100 is provided with an annular groove 104 which is aligned with an internally threaded transverse bore 106 and the spindle upper portion 42. Seated in the bore 106 is a setscrew 108 which projects into the annular groove 104 so as to prevent longitudinal movement of the fitting 100 and the cam rod 50. Threadedly engaged in the fitting and extending radially therefrom is an operating member 110.

Fixedly secured in a preadjusted position on the upper part of the lower portion 44 of the spindle 40 is a cup-shaped collar which is referred to in general by the reference numeral 112. The collar 112 includes a relatively thick bottom wall 114 and an annular upper body portion 116. The collar 112 is adjustably secured to the spindle 40 by means of a setscrew (not shown).

The collar 112, among other things, serves to position the reamer 86. The bottom wall 114 is provided with an internally threaded bore 118 in which there is seated a head 120 of a pin 122. The pin 122 is in turn received in a slot 124 in the upper part of the reamer 86. Disposed in the outer part of the bore 118 is an adjusting screw 126. Disposed within the bore 118 intermediate the adjusting screw 126 and the head 120 is a spring 128 which resiliently resists the movement of the reamer 86 to the right and which retains it in position with the cam rod 50.

Secured to the lower part of the upper portion 42 of the spindle 40 is a pair of diametrically opposite projecting drive pins 130. The pins 130 cooperate with the housing portion 36 in a manner to provide an additional driving interlock between the housing portion 36 and the spindle portion 38 during the reaming of the plates 10 and 12, for example, utilizing the reamers 62, 74 and 86.

In order to actuate the multiple reaming tool 34, there is mounted on the spindle 40 adjacent the inner section of the portions 42 and 44 a guide member 132. The guide member 132 includes a circular base portion 134 which is slidable on the spindle lower portion 44. Extending upwardly from the base portion 134 in diametrically opposite relation is a pair of fingers 136.

The guide member 132 is limited to sliding movement only by a projection 135 which is seated in a longitudinal groove 137 in the spindle 40.

Carried by the bottom wall 114 of the collar 112 is a plurality of circumferentially spaced rods 138 which are disposed parallel to the axis of the spindle 40. The rods 138 have secured to their lower ends a work engaging plate 140 which is annular and which is guided on the spindle lower portion 44. Connected to the upper ends of the rod 138 above the bottom wall 114 is a plate 142. The plate 142 may either directly engage the guide member 132 or there may be disposed intermediate the plate 142 the base 134 of the guide member and the adjustable washer assembly 144. The adjustable washer assembly 144 includes an upper washer 148 and a similar washer threaded thereto whereby the thickness of the adjustable washer member 144 may be varied as is desired.

In order that the bores 14 and 16 may initially be reamed to the desired diameter, there is suitably secured to the extreme lower end of the spindle 40 a conventional reamer 150. Disposed immediately above the reamer 150 is an annular recess 152 in the lower part of the spindle 40 to facilitate the lubrication of the reamer 150 during a reaming operation.

Referring now to FIGURE 13 in particular, it will be seen that the housing portion 36 of the tool 34 includes a lower tubular housing 154 which terminates at its upper end in an integral tapered shank 156 of a size and shape to fit the chuck of a machine tool, such as a drill press or other type of machine tool which rotates a tool and which is capable of moving the tool longitudinally with respect to the tool and through a workpiece.

Formed in an intermediate part of the housing 154 is a spiral groove 158. The spiral groove 158 has received therein the operating member 110. Normally, the operating member 110 is disposed in the extreme lower part of the spiral groove 158.

Disposed below the spiral groove 158 and rotated relative thereto, as is best illustrated in FIGURES 13 and 17, is a radiating internally threaded transverse bore 159. Threadedly engaged in the bore 159 is a plug 160 which has a vertically extending rib 162. The rib 162 is received in a longitudinal groove (not shown) formed in the upper portion 42 of the spindle 40. The rib 162 interlocks with the spindle 40 so as to drivingly connect the spindle portion 38 to the housing portion 36 and at the same time to permit longitudinal sliding movement between the spindle portion 38 and the housing portion 36.

Encircling the lower part of the housing 154 is a collar 164. The collar 164 is secured in place on the housing 154 by means of a setscrew 166.

The lower part of the housing 154 is provided with an enlarged portion 168 of its bore. Seated in the enlarged bore portion 168 is a reduced upper portion 170 of the drive member which is referred to in general by the reference numeral 172. The drive member 172 also includes a larger diameter lower portion 174 which is disposed below the lower end of the housing 154 and aligned with the collar 164. The drive member 172 is secured to the housing 154 against longitudinal movement and for limited rotation only by means of a pin 176 which is seated in an arcuate slot 178 formed in the housing 154.

Formed in the lower end of the collar 164 is an annular recess 180. A similar recess 182 is formed in the upper end of the lower portion 174 of the drive member 172. Seated in the recesses 180 and 182 is a spring 184 which has one end thereof anchored to the collar 164 and the other end thereof anchored to the drive member 172.

Formed in the lower part of the drive member 172 are internal longitudinal grooves 186, the grooves 186, as is best illustrated in FIGURE 14 being in diametrically opposite relation. Grooves 186 are adapted to receive the guide members 130.

Also formed in the lower under part of the drive member 172 are longitudinally extending finger receiving grooves 188. The finger receiving grooves 188 are disposed in diametrically opposite relation and receive the fingers 136. The finger receiving grooves 188 have cammed lower portions 190 to facilitate the engagement of the guide fingers 136 in the finger engaging grooves 188.

The shank 156 has a bore 192 formed in the lower part thereof, which bore forms an extension of the bore of the housing 154. The bore 192 has an enlarged lower portion 194.

Seated in the bore 192 is an upper end of an elongated stop member 196. The upper portion of the stop member 196 is provided with external threads 198. The stop member 196 also has formed in the upper portion thereof a longitudinally extending keyway 200 in which there is received a reduced portion 202 of a pin 204 threadedly engaged in a bore 206 formed in the shank 156. Thus the stop member 196 is mounted for sliding movement only longitudinally of the housing portion 36.

Seated in the enlarged bore portion 194 is a drive nut 208 which is internally threaded and which is threadedly engaged on the threaded upper portion 198 of the stop member 196. The lower end of the drive nut 208 is in the form of a bevel gear 210. The bevel gear 210 is in turn meshed with a bevel gear 212.

The bevel gear 212 has a shaft portion 214 which is journalled in a bushing 216 threadedly engaged in the housing 154 in the internally threaded bore 218. The drive nut 208 may be driven by rotating the bevel gear 212 through the shaft 214. Once the position of the stop member 196 has been adjusted in this manner, the bevel gear 212 may be locked against rotation by tightening down on the bushing 216 so as to jam the bevel gears 210 and 212.

Slidably journalled in the housing 154 is a filler block 220 which protects the gears 210 and 212. Bearing against the filler block 220 is a coil spring 222 whose opposite end normally engages the upper end of the spindle 40. Thus separation of the housing portion 36 and the spindle portion 38 is urged by the spring 212.

When the spindle portion 38 is assembled in the housing portion 36, the spindle portion 38 is in extended position and the spindle portion is retained in the housing portion 36 by the engagement of the operating member 110 in the spiral slot 158. When the spindle portion 38 has this relationship to the housing portion 36 and the tool 34 is engaged in a suitable machine tool, the tool 34 is moved downwardly through the plates 10 and 12 with the reamer 150 reaming the bores 14 and 16 to the size desired. This is best illustrated on FIGURES 2 and 3.

As the reamer 150 approaches a lower end of its reaming operation, the plate 140 comes into engagement with the upper surface of the plate 10. Further downward movement of the tool 34 results in the relative downward movement of the spindle 40 with respect to the plate 140. As a result, the guide member 132 is held stationary as the guide member 172 moves down thereover. Continued downward movement of the guide member 172 over the guide member 132 results in the guide fingers 136 entering into the guide finger receiving grooves 188 after initial engagement of the cam surfaces 190. This results in the limited rotation of the drive member 172 so as to align the grooves 186 with the drive pins 130. Further downward movement of the tool 34 results in the drive pins 130 entering into the grooves 186 and thus additionally locking the spindle portion 38 to the housing portion 36 to effect the driving of the spindle portion 38 with the housing portion 36.

After the drive pins 130 enter the grooves 186, the guide member 132 engages the shoulder 46 and thus further downward movement of the spindle portion 38 is prevented. As the housing portion 36 continues to move downwardly, the operating member 110 rotates in the spiral slot 158 and thus the cam rod 50 is rotated. The rotation of the cam rod 50 effects the projection of the reamers 62, 74 and 86 to form the interior annular grooves in the plates 10 and 12 as is illustrated in FIGURE 5. It is to be noted that the reamer 74 is so positioned whereby it is disposed at the inner section between the plates 10 and 12 and thus forms the recesses 20 and 26. On the other hand, the reamer 62 is so positioned whereby it forms the recesses 28, 30 and 32 and the reamer 86 forms the recesses 18, 22 and 24.

Referring now to FIGURE 6 in particular, it will be seen that in lieu of the plate 10 being associated with the plate 12, it is associated with a plate 224. The plate 224 is thinner than the plate 12 and has a bore 226 therethrough aligned with the bore 14 and the plate 10. By changing the setting of the tool 34, the tool 34 may be used in a reaming operation of the plates 10 and 24. As a result, the bores 14 and 226 will be reamed to the desired diameter and the recesses 18, 20, 22 and 24 will be formed in the interior of the plate 10. Also, a recess 228 and recesses 230 and 232 will be formed in the plate 224, the recesses corresponding to the recesses 26, 30 and 32, respectively. It will be seen that no recess corresponding to the recess 28 will be formed. This is because the combined thicknesses of the plates 10 and 224 is less than the combined thicknesses of the plates 10 and 12.

Referring now to FIGURE 7 in particular, it will be seen that associated with the plate 12 is a plate 234. The plate 234 is thinner than the plate 10 and has a bore 236 therethrough aligned with the bores 16. In order that the reamer 74 may be disposed at the intersection between the plates 234 and the plates 10 and 12, it is necessary that the effected position of the plate 140 be adjusted. This is accomplished by adjusting the thickness of the washer 144. Thus when the tool 34 is used in conjunction with a plate 234 and 12, the usual grooves or recesses 26, 28, 30 and 32 are formed in the plate 12. Also, recesses 238, 240 and 242 are formed in the plate 234, these recesses corresponding to the recesses 26, 24 and 20, respectively. Inasmuch as the spindle 40 does not enter into the plate 234 as far as in the plate 10, the upper cutter 94 of the reamer 86 does not come into play.

At this time it is pointed out that the amount the individual reamers are projected is controlled by the engagement of the upper end of the spindle 40 with the lower end of the stop member 196. By varying the position of the stop member 196, the shape of the various recesses or grooves formed in the plate may be varied.

Referring now to FIGURE 18, there is illustrated a plate 242 having a bore 244 therethrough, grooves 246 and 248, corresponding to the grooves 18 and 20, are formed in the plate 242 at opposite ends of the bore 244. Recesses 250 and 252, corresponding to the recesses 26 and 24, are formed in the plate 242 intermediate the ends of the bore 244. The plate 242 is a sample of a single plate reaming operation.

It is also pointed out that although three reamers have been illustrated, if desired, the number of reamers may be varied. Also, the shape of the reamers or the arrangement of the cutters thereon may be varied as desired.

The foregoing is considered as illustrative only of the principles of the invention. Further, since numerous modifications and changes will readily occur to those skilled in the art it is not desired to limit the invention to the exact construction and operation shown and described, and accordingly all suitable modifications and equivalents may be resorted to, falling within the scope of the invention as claimed.

What is claimed as new is as follows:

1. A multiple reaming tool comprising a housing and a spindle, said housing having a tubular lower portion and a rotary machine engaging portion, said spindle being tubular and including a bore having disposed therein for rotation a cam rod, a longitudinal recess in a lower portion of said spindle opening into said bore, at least one reamer seated in said recess and engaging said cam rod, leaf return springs seated in said recess above and below said reamer and resiliently resisting projection of said reamer, said reamer being normally seated in said recess and projected therefrom by rotation of said cam rod relative to said spindle, said spindle having an upper portion seated in said housing, drive means extending between said spindle and said housing limiting relative movement between said spindle and said housing to longitudinal movement, and operating means extending between said cam rod and said housing to rotate said cam rod in response to longitudinal movement of said spindle relative to said housing.

2. A multiple reaming tool comprising a housing and a spindle, said housing having a tubular lower portion and a rotary machine engaging portion, said spindle being tubular and including a bore having disposed therein for rotation a cam rod, a longitudinal recess in a lower portion of said spindle opening into said bore, at least one reamer seated in said recess and engaging said cam rod, a spring clip securing said reamer to said cam rod, said reamer being normally seated in said recess and projected therefrom by rotation of said cam rod relative to said spindle, said spindle having an upper portion seated in said housing, drive means extending between said spindle and said housing limiting relative movement between said spindle and said housing to longitudinal movement, and operating means extending between said cam rod and said housing to rotate said cam rod in response to longitudinal movement of said spindle relative to said housing.

3. A multiple reaming tool comprising a housing and a spindle, said housing having a tubular lower portion and a rotary machine engaging portion, said spindle being tubular and including a bore having disposed therein for rotation a cam rod, a longitudinal recess in a lower portion of said spindle opening into said bore, at least one reamer seated in said recess and engaging said cam rod, said reamer being normally seated in said recess and projected therefrom by rotation of said cam rod relative to said spindle, said spindle having an upper portion seated in said housing, drive means extending between said spindle and said housing limiting relative movement between said spindle and said housing to longitudinal movement, and operating means extending between said cam rod and said housing to rotate said cam rod in response to longitudinal movement of said spindle relative to said housing, and adjustable stop means carried by said housing engageable with said spindle to limit the movement to said spindle relative to said housing thus limit the operation of said operating means to limit the projection of said reamer.

4. A multiple reaming tool comprising a housing and a spindle, said housing having a tubular lower portion and a rotary machine engaging portion, said spindle being tubular and including a bore having disposed therein for rotation a cam rod, a longitudinal recess in a lower portion of said spindle opening into said bore, at least one reamer seated in said recess and engaging said cam rod, said reamer being normally seated in said recess and projected therefrom by rotation of said cam rod relative to said spindle, said spindle having an upper portion seated in said housing, drive means extending between said spindle and said housing limiting relative movement between said spindle and said housing to longitudinal movement, and operating means extending between said cam rod and said housing to rotate said cam rod in response to longitudinal movement of said spindle relative to said housing, and adjustable stop means carried by said housing engageable with said spindle to limit the movement to said spindle relative to said housing thus limit the operation of said operating means to limit the projection of said reamer, said adjustable stop means including a threaded stop member, a rotatable feed nut threaded on said stop member, means carried by said housing securing said stop member for longitudinal movement only and said nut for rotary movement only.

5. A multiple reaming tool comprising a housing and a spindle, said housing having a tubular lower portion and a rotary machine engaging portion, said spindle being tubular and including a bore having disposed therein for rotation a cam rod, a longitudinal recess in a lower portion of said spindle opening into said bore, at least one reamer seated in said recess and engaging said cam rod, said reamer being normally seated in said recess and projected therefrom by rotation of said cam rod relative to said spindle, said spindle having an upper portion seated in said housing, drive means extending between said spindle and said housing limiting relative movement between said spindle and said housing to longitudinal movement, operating means extending between said cam rod and said housing to rotate said cam rod in response to longitudinal movement of said spindle relative to said housing, a work engaging actuator carried by said spindle to affect the longitudinal movement of said spindle relative to said housing, and other drive means carried by said spindle and engaged by said work-engaging actuator for movement into interlocking engagement with said housing.

6. A multiple reaming tool comprising a housing and a spindle, said housing having a tubular lower portion and a rotary machine engaging portion, said spindle being tubular and including a bore having disposed therein for rotation a cam rod, a longitudinal recess in a lower portion of said spindle opening into said bore, at least one reamer seated in said recess and engaging said cam rod, said reamer being normally seated in said recess and projected therefrom by rotation of said cam rod relative to said spindle, said spindle having an upper portion seated in said housing, drive means extending between said spindle and said housing limiting relative movement between said spindle and said housing to longitudinal movement, and operating means extending between said cam rod and said housing to rotate said cam rod in response to longitudinal movement of said spindle relative to said housing, a work engaging actuator carried by said spindle to affect the longitudinal movement of said spindle relative to said housing, said work engaging actuator being formed in sections slidable relative to each other and one of which is fixed to said spindle and the other being engageable with a work piece, said other section being adjustable in length whereby the position of said reamer with respect to a workpiece may be varied.

7. A multiple reaming tool comprising a housing and a spindle, said housing having a tubular lower portion and a rotary machine engaging portion, said spindle being tubular and including a bore having disposed therein for rotation a cam rod, a longitudinal recess in a lower portion of said spindle opening into said bore, at least one reamer seated in said recess and engaging said cam rod, said reamer being normally seated in said recess and projected therefrom by rotation of said cam rod relative to said spindle, said spindle having an upper portion seated in said housing, drive means extending between said spindle and said housing limiting relative movement between said spindle and said housing to longitudinal movement, operating means extending between said cam rod and said housing to rotate said cam rod in response to longitudinal movement of said spindle relative to said housing, and other drive means carried by said spindle and operable simultaneously with said operating means to further drivingly interconnect said spindle and said housing.

8. A multiple reaming tool comprising a housing and a spindle, said housing having a spindle engaging portion and a rotary machine engaging portion, said spindle being hollow and including a bore having a cam rod rotatable therein, a radial recess in the lower portion of said spindle opening into said bore, at least one cutting member seated in the recess and engaging said cam rod, said element movable from said recess by rotation of the cam rod relative to the spindle, the spindle having an upper portion projecting into the housing, drive means between the spindle and housing limiting relative movement therebetween to longitudinal movement, operating means extending between the rod and housing to cause relative rotation therebetween for moving said element, and other drive means between the spindle and housing and operable simultaneously with said operating means to further drivingly interconnect said spindle and housing.

9. A device as recited in claim 8 wherein the other drive means comprise interengaging fingers and slots, and the degree of engagement thereof is proportional to the distance of extension of the cutting member from the spindle recess.

10. A device as recited in claim 8 wherein the cutting member is automatically retracted by spring means.

11. A device as recited in claim 8 wherein the first recited drive means comprises interengaging groove means and ridge means, one of said groove means and ridge means being mounted on a member movable relative to the spindle and housing for releasing the drive means.

References Cited in the file of this patent

UNITED STATES PATENTS

| | | |
|---|---|---|
| 1,720,950 | Edwards | July 16, 1929 |
| 2,411,426 | Hall | Nov. 19, 1946 |
| 2,585,038 | Rogacki | Feb. 12, 1952 |